(12) United States Patent
Duarte et al.

(10) Patent No.: US 8,153,010 B2
(45) Date of Patent: Apr. 10, 2012

(54) METHOD TO INHIBIT SCALE FORMATION IN COOLING CIRCUITS USING CARBON DIOXIDE

(75) Inventors: Daniel D. Duarte, Newark, DE (US); Meenakshi Sundaram, Newark, DE (US); Jeffrey E. Arbogast, Newark, DE (US)

(73) Assignee: American Air Liquide, Inc., Fremont, CA (US)

( * ) Notice: Subject to any disclaimer, the term of this patent is extended or adjusted under 35 U.S.C. 154(b) by 654 days.

(21) Appl. No.: 12/352,345

(22) Filed: Jan. 12, 2009

(65) Prior Publication Data

US 2010/0176060 A1    Jul. 15, 2010

(51) Int. Cl.
*C02F 5/08* (2006.01)
(52) U.S. Cl. .................. 210/696; 210/739; 210/743
(58) Field of Classification Search .......... 210/696
See application file for complete search history.

(56) References Cited

U.S. PATENT DOCUMENTS

| | | | | |
|---|---|---|---|---|
| 3,361,150 A | * | 1/1968 | Horner | 204/404 |
| 4,464,315 A | * | 8/1984 | O'Leary | 261/110 |
| 4,547,294 A | | 10/1985 | Goeldner | |
| 4,648,043 A | * | 3/1987 | O'Leary | 700/285 |
| 4,659,459 A | * | 4/1987 | O'Leary et al. | 210/87 |
| 4,931,187 A | | 6/1990 | Derham et al. | |
| 5,057,229 A | * | 10/1991 | Schulenburg et al. | 210/743 |
| 5,611,933 A | | 3/1997 | Cleveland | |
| 5,855,791 A | * | 1/1999 | Hays et al. | 210/696 |
| 6,068,012 A | * | 5/2000 | Beardwood et al. | 137/3 |
| 6,096,221 A | | 8/2000 | Kerchouche et al. | |
| 6,746,609 B2 | | 6/2004 | Stander | |

FOREIGN PATENT DOCUMENTS

| | | |
|---|---|---|
| CA | 2 360 517 | 5/2001 |
| EP | 0 899 240 | 3/1999 |
| FR | 2 725 977 | 4/1996 |
| FR | 2 801 300 | 5/2001 |
| JP | 07 109585 | 4/1995 |

OTHER PUBLICATIONS

European Search Report for EP 10 15 0440, dated Apr. 9, 2010.

* cited by examiner

*Primary Examiner* — Peter A Hruskoci
(74) *Attorney, Agent, or Firm* — Allen E. White

(57) ABSTRACT

Scaling is controlled in a cooling water system with CO2 based upon measurements of the cooling water's pH, alkalinity and $Ca^{2+}$ concentration.

2 Claims, 4 Drawing Sheets

METHOD TO INHIBIT SCALE FORMATION IN COOLING CIRCUITS USING CARBON DIOXIDE

CROSS-REFERENCE TO RELATED APPLICATIONS

None.

BACKGROUND

Typically, heat removal from industrial chemical, thermal or nuclear processes is achieved through evaporative cooling in a cooling circuit such as a cooling tower. As best illustrated in FIGS. 1 and 2, a typical type of cooling circuit is one including a cooling tower 1. As best depicted in FIG. 1, cooling water trickles down through a fill media 6 in the cooling tower 1, falls as rain 8, and accumulates in a basin 3. Makeup water 5 is often added to the basin 3 or other point in the cooling water circuit. Cooling water is pumped from the basin 3 via pump 7 to heat exchange system 9 where heat is exchanged with an industrial physical, chemical, or nuclear process.

As best illustrated in FIG. 1, one type of cooling tower includes water distribution equipment discharging cooling water over a fill media 6 (also called a packing). The cooling water trickles over the high surface area fill media 6 thereby allowing a greater degree of evaporation of the cooling water from thin films of it on the fill media 6 surfaces. A flow of air accelerating the evaporation is provided in one of two ways: natural draft or mechanical draft. In a natural draft system, due to the lower density of warmer air underneath the cooling tower (in comparison to cooler air outside the cooling tower at the same pressure), a flow of air 4 rises up through the fill media 6. In a mechanical draft system, a flow of air 4 is directed either up through or across the fill media 6 with the aid of blowers (not illustrated). A forced mechanical draft system involves a blower directing a flow of air at the fill media 6 while an induced mechanical draft system involves a pulling a flow of air up through or across the fill media 6.

As best illustrated in FIG. 2, another type of cooling tower does not include a fill media. Instead, water distribution equipment (such as a shower head) allows the cooling water to shower directly down into the basin 3.

There are at least three types of losses of cooling water from the cooling circuit. First, a portion of the trickling water, in the form of droplets or films of water, evaporates into the air. The latent heat of vaporization is removed from the non-evaporated portion of the cooling water thereby cooling it. Second, drift (sometimes called windage) is produced by a flow of air 4 carrying droplets of water out a top 2 of the cooling tower 1. The droplets impinge against a surface of a drift eliminator 10 so that some of the droplets that would otherwise be carried out the top 2 of the cooling tower will instead drip down over the fill media 6. Third, blowdown 12 is performed continuously or performed periodically when the cooling water in the basin 3 becomes too concentrated.

During this process a significant amount of water is lost through evaporation. As a result, dissolved minerals in the cooling water remaining after evaporation increase in concentration. As the concentration of a given mineral increases past its saturation point, scale (accretions of certain precipitated minerals) may start to form inside pipes, heat exchangers and various components of the cooling circuit. For example, an increase in calcium ($Ca^{2+}$), will promote calcium carbonate ($CaCO_3$) scale formation—the most common type of scale.

Over a period of time, scale build-up reduces the efficiency of heat transfer between a heat exchanger and the cooling water and restricts the flow of cooling water through the cooling circuit. As a result, scaling increases the operating costs, because more and more energy is needed to achieve a constant overall heat transfer rate in the cooling water system. If it is allowed to become uncontrolled, scaling can also result in a costly shutdown of the associated facility in order that excessive amounts of scale can be removed from equipment in contact with the cooling water.

To make up for losses from evaporation in the cooling tower, drift and blowdown (discharge of an amount of cooling water increasingly concentrated in various organic and inorganic constituents), makeup water is added to cooling circuits. Installations can use various types of water as their makeup water such as surface waters (lakes, rivers etc.), water from aquifers, process waters, industrial waters, or seawater. In some cases, the properties of the makeup water, such as temperature, pH, alkalinity, $Ca^{2+}$ and magnesium ($Mg^{2+}$) hardness, conductivity, total dissolved solids (TDS), etc., can vary significantly when compared on a weekly, daily, or even hourly basis. Changes in these properties can have an impact on scale formation. Operating parameters within a cooling circuit can also fluctuate either because of varying heat load, flow rates, meteorological conditions, etc. These changes in cooling circuit operating parameters can also have an impact on scale formation. While the scaling mechanism is well known in tightly controlled conditions and several schemes have been developed to control it, the above combined impacts increase the difficulty of controlling scale formation.

Several solutions exist to inhibit, prevent, and/or remove scale from cooling circuits and towers. The most common solutions are physical removal of the scale, addition of scale inhibiting chemicals, and addition of pH change agents to dissolve the scale. One type of pH agent used in cooling circuits include mineral acids such as hydrochloric acid (HCl) or sulfuric acid ($H_2SO_4$). However, mineral acids have a high degree of hazardousness and corrosivity thereby increasing the human and capital risk involved in handling it. In the case of $H_2SO_4$, it increases the sulfate $SO_4^{2-}$ concentration in the blowdown thereby potentially subjecting discharge of blowdown to environmental regulation. Softening of the makeup water and/or recirculation water is yet another option, but this quite often involves expensive equipment having intensive maintenance needs.

Carbon dioxide ($CO_2$) is a less commonly used pH change agent. Although there are several technical and environmental advantages to using $CO_2$ as a pH change agent (lower degree of hazardousness and corrosivity and reduced sulfate discharge). The typically larger amount of $CO_2$ consumed vs. mineral acid consumed is especially noticeable when cooling circuit operates at a high concentration factor (the ratio of the concentration of a particular chemical constituent in the circulating water versus that in the makeup water) and/or when the cooling water has a high $Ca^{2+}$ content and/or when the cooling water has a high alkalinity. Moreover, $CO_2$ consumption is high due to losses in the cooling tower.

Thus, there is a need in the field of cooling water circuits for a better solution for preventing, inhibiting, or removing scale.

SUMMARY

There is provided a method for controlling scale formation in a cooling water system that includes the following steps. A desired scaling index value indicating a desired degree of scaling or absence of scaling in the cooling water system is selected. A sample of cooling water from the cooling water system is obtained. A $Ca^{2+}$ concentration and alkalinity of the sample is measured. A setpoint pH is calculated based upon the selected scale index value and the measured $Ca^{2+}$ concentration and alkalinity. A pH of the cooling water is measured. An amount of $CO_2$ is added to the cooling water based upon the setpoint pH and measured pH.

The above method may include any one or more of the following aspects:

a temperature of the sample and a total dissolved solids or conductivity of the sample is measured, wherein the calculated setpoint pH is based upon:
  a) the selected scale index value,
  b) the measured $Ca^{2+}$ concentration,
  c) the measured alkalinity,
  d) the measured temperature, and
  e) either the measured total dissolved solids or the measured conductivity.

the cooling water system includes a cooling tower, a basin adapted to receive cooling water from the cooling tower, and a heat exchange system adapted and configured to exchange heat between a hot fluid from a process and the cooling water and discharge the cooling water toward a cooling water inlet formed in the cooling tower, and the method further includes the step of removing at least a portion of $CO_2$ from the cooling water with a decarbonator at a point between the heat exchange system and the cooling water inlet.

the cooling water system includes a cooling tower, a basin adapted to receive cooling water from the cooling tower, and a heat exchange system adapted and configured to exchange heat between a hot fluid from a process and the cooling water and discharge the cooling water toward a cooling water inlet formed in the cooling tower, and the method further includes the steps of:
  discharging an amount of cooling water from the basin;
  adding makeup water to the cooling water system to replace the cooling water discharged from the basin; and
  adding a constant amount of mineral acid pH change agent to the makeup water.

the cooling water system includes a cooling tower, a basin adapted to receive cooling water from the cooling tower, and a heat exchange system adapted and configured to exchange heat between a hot fluid from a process and the cooling water and discharge the cooling water toward a cooling water inlet formed in the cooling tower, and the method further includes the steps of:
  discharging an amount of cooling water from the basin;
  adding makeup water to the cooling water system to replace the cooling water discharged from the basin;
  selecting a desired alkalinity in the makeup water;
  measuring an alkalinity of the makeup water; and
  adding a mineral acid pH change agent to the makeup water based upon the measured and desired makeup water alkalinities.

the cooling water system includes a cooling tower, a basin adapted to receive cooling water from the cooling tower, and a heat exchange system adapted and configured to exchange heat between a hot fluid from a process and the cooling water and discharge the cooling water toward a cooling water inlet formed in the cooling tower, and the method further includes the steps of:
  discharging an amount of cooling water from the basin;
  adding makeup water to the cooling water system to replace the cooling water discharged from the basin;
  selecting a desired scaling index value indicating a desired degree of scaling or absence of scaling in the makeup water;
  obtaining a sample of cooling water from the makeup water;
  measuring a $Ca^{2+}$ concentration and alkalinity of the makeup water sample;
  calculating a second setpoint pH based upon the selected makeup water scale index value and the $Ca^{2+}$ concentration and alkalinity measured from the makeup water sample;
  measuring a pH of the makeup water; and
  adding an amount of mineral acid pH change agent to the makeup water based upon the second setpoint pH and the pH measured from the makeup water sample.

the cooling water system includes a cooling tower, a basin adapted to receive cooling water from the cooling tower, and a heat exchange system adapted and configured to exchange heat between a hot fluid from a process and the cooling water and discharge the cooling water toward a cooling water inlet formed in the cooling tower, and the method further includes the steps of:
  discharging an amount of cooling water from the basin;
  adding makeup water to the cooling water system to replace the cooling water discharged from the basin;
  selecting a desired alkalinity in the cooling water;
  determining an alkalinity setpoint to be maintained in the makeup water based upon the alkalinity desired in the cooling water and the alkalinity measured in the cooling water;
  measuring an alkalinity of the makeup water; and
  adding a mineral acid pH change agent to the makeup water based upon the measured makeup water alkalinity and the alkalinity setpoint to be maintained in the makeup water.

the cooling water system includes a cooling tower, a basin adapted to receive cooling water from the cooling tower, and a heat exchange system adapted and configured to exchange heat between a hot fluid from a process and the cooling water and discharge the cooling water toward a cooling water inlet formed in the cooling tower, and the method further includes the steps of:
  discharging an amount of cooling water from the basin;
  adding makeup water to the cooling water system to replace the cooling water discharged from the basin;
  selecting an alkalinity setpoint to be maintained in the cooling water;
  adding a mineral acid pH change agent to the makeup water based upon the alkalinity setpoint to be maintained in the cooling water.

the method further includes the steps of:
  providing a cabinet enclosing:
    first and second programmable logic controllers, the second programmable logic controller being written with an algorithm adapted to perform said step of calculating a setpoint pH,
    a $Ca^{2+}$ concentration and alkalinity measurement device adapted and configured to perform said step of measuring the $Ca^{2+}$ concentration and alkalinity of the sample,
    a pH probe adapted and configured to perform said step of measuring the pH of the sample;
  sending a signal corresponding to the measured $Ca^{2+}$ concentration and alkalinity from the $Ca^{2+}$ concentration and alkalinity measurement device to the second programmable logic controller;

sending a signal corresponding to the setpoint pH from the second controller to the first programmable logic controller;

sending a signal corresponding to the measured pH from the pH probe to the first programmable logic controller, wherein said step of adding comprises:

determining with the first programmable logic controller whether or not $CO_2$ should be added to the cooling water system based upon whether the measured pH is higher than the setpoint pH, and adding the amount of $CO_2$ based upon said step of determining.

There is also provided another method for controlling scale formation in a cooling water system, wherein the cooling water system includes a cooling tower, a basin adapted to receive cooling water from the cooling tower, and a heat exchange system adapted and configured to exchange heat between a hot fluid from a process and the cooling water and discharge the cooling water toward a cooling water inlet formed in the cooling tower. The method includes the following steps. A desired scaling index value is selected indicating a desired degree of scaling or absence of scaling in the cooling water system. A first sample of cooling water is obtained from the cooling water system, the first sample not being obtained from the cooling water received by the basin from the cooling tower. A $Ca^{2+}$ concentration and alkalinity of the first sample is measured. A first setpoint pH is calculated based upon the selected scale index value and the $Ca^{2+}$ concentration and alkalinity measured in the first sample. A second sample of cooling water is obtained, the second sample being obtained from the cooling water received by the basin from the cooling tower. A $Ca^{2+}$ concentration and alkalinity of the second sample is measured. A second setpoint pH is calculated based upon the selected scale index value and the $Ca^{2+}$ concentration and alkalinity measured in the second sample. A third pH setpoint is selected intermediate that of the first and second pH setpoints. A pH of the cooling water is measured. An amount of $CO_2$ is added to the cooling water based upon the third setpoint pH and measured pH.

There is also provided an assembly for controlling scale formation in a cooling water system that includes: an inlet conduit, a cooling water sampling unit, a pH probe, a $CO_2$ injector, a first programmable logic controller, and a second programmable logic controller. The inlet conduit is adapted to withdraw a sample of cooling water from a cooling water system. The cooling water sampling unit is adapted to measure a $Ca^{2+}$ concentration and an alkalinity of the withdrawn sample of cooling water. The pH probe is adapted and configured to measure a pH of the cooling water in the cooling water system. The first programmable logic controller is written with an algorithm, wherein the first programmable logic controller is adapted and configured to receive a signal from the cooling water sampling unit representing the cooling water $Ca^{2+}$ concentration and alkalinity measured by the cooling water sampling unit, and the algorithm of the first programmable logic controller is adapted to calculate a pH setpoint based upon both a desired scaling index value stored therein and the measured cooling water $Ca^{2+}$ concentration and alkalinity. The second programmable logic controller is written with an algorithm, wherein the second programmable logic controller is adapted to receive a signal from the first programmable logic controller representing said pH setpoint and a signal from the pH probe representing a pH of the cooling water measured by the pH probe, and the algorithm of the second programmable logic controller is adapted to determine how much $CO_2$ should be added to the cooling water based upon the pH setpoint and the pH probe signal representing the cooling water pH. The $CO_2$ injector is adapted to: i) receive a signal from said second programmable logic controller representing the determined amount of $CO_2$ to be added to the cooling water, and ii) add the determined amount of $CO_2$ to the cooling water.

The assembly may include one or more of the following aspects:

cooling water sampling unit is further adapted to measure both a temperature and also either a total dissolved solids or a conductivity of the withdrawn sample of cooling water.

the first programmable logic controller is further adapted and configured to receive a signal from the cooling water sampling unit representing the measured cooling water temperature and either the measured cooling water total dissolved solids or conductivity, as measured by the cooling water sampling unit.

the algorithm of the first programmable logic controller calculates the pH setpoint based upon:

a desired scaling index value stored therein; and the measured cooling water $Ca^{2+}$ concentration, alkalinity, temperature, and either the measured cooling water total dissolved solids or conductivity.

the assembly further comprises a mineral acid injector and third and fourth programmable logic controllers, wherein:

the cooling water sampling unit is further adapted to measure a $Ca^{2+}$ concentration and alkalinity of makeup water introduced into the cooling water system;

the third programmable logic controller is adapted to receive a signal from the cooling water sampling unit representing the measured makeup water $Ca^{2+}$ concentration and alkalinity;

the third programmable logic controller is written with an algorithm adapted to calculate a second pH setpoint based upon both a desired scaling index value stored therein and the measured makeup water $Ca^{2+}$ concentration and alkalinity;

the fourth programmable logic controller being adapted to receive a signal from the third programmable logic controller representing the pH setpoint and a signal from the pH probe representing a pH of the makeup water measured by the pH probe, the fourth programmable logic controller algorithm being adapted to determine how much mineral acid should be added to the makeup water based upon the second pH setpoint and the pH probe signal representing the makeup water pH, wherein the mineral acid injector is adapted to:

receive a signal from the fourth programmable logic controller representing the determined amount of mineral acid to be added to the makeup water; and add the determined amount of mineral acid to the makeup water.

the assembly further comprises a mineral acid injector and a third programmable logic controller written with an algorithm, wherein:

the cooling water sampling unit is further adapted to measure an alkalinity of makeup water introduced into the cooling water system;

the third programmable logic controller is adapted to receive a signal from the cooling water sampling unit representing the measured makeup water alkalinity;

the algorithm of the third programmable logic controller is adapted to determine an amount of mineral acid to be added to the makeup water based upon the signal representing the measured makeup water alkalinity; and the mineral acid injector is adapted to receive a signal from the third programmable logic controller representing the determined amount of mineral acid and add the determined amount of mineral acid to the makeup water.

the assembly further comprises a mineral acid injector and a third programmable logic controller written with an algorithm, wherein:

the third programmable logic controller is adapted to receive a signal from the cooling water sampling unit representing the measured cooling water alkalinity;

the algorithm of the third programmable logic controller is adapted to determine an amount of mineral acid to be added to the makeup water based upon the signal representing the measured cooling water alkalinity; and the mineral acid injector is adapted to receive a signal from the third programmable logic controller representing the determined amount of mineral acid and add the determined amount of mineral acid to the makeup water.

the assembly further comprises a mineral acid injector and third and fourth programmable logic controllers, wherein:

said cooling water sampling unit is further adapted to measure an alkalinity of makeup water introduced into the cooling water system;

said third programmable logic controller being adapted to receive a signal from said cooling water sampling unit representing said measured cooling water alkalinity and determine a makeup water alkalinity setpoint to be maintained in the makeup water;

said fourth programmable logic controller is adapted to receive a signal from said cooling water sampling unit representing the measured makeup water alkalinity;

said fourth programmable logic controller is written with an algorithm adapted to determine how much mineral acid should be added to the makeup water based upon the makeup water alkalinity setpoint from said third programmable logic controller;

said mineral acid injector is adapted to:
  receive a signal from said fourth programmable logic controller representing the determined amount of mineral acid to be added to the makeup water; and
  add the determined amount of mineral acid to the makeup water.

There is also provided another assembly for controlling scale formation in a cooling water system that includes: an inlet conduit adapted to withdraw a sample of cooling water from a cooling water system; a cooling water sampling unit adapted to measure a $Ca^{2+}$ concentration and an alkalinity of the withdrawn sample of cooling water; a pH probe adapted and configured to measure a pH of the cooling water in the cooling water system; a $CO_2$ injector; and a control system written with an algorithm. The control system is adapted and configured to receive a signal or signals from the cooling water sampling unit representing the cooling water $Ca^{2+}$ concentration and alkalinity measured by said cooling water sampling unit and receive a signal from the pH probe representing a pH of the cooling water measured by the pH probe. The algorithm is adapted to calculate a pH setpoint based upon both a desired scaling index value stored therein and the cooling water $Ca^{2+}$ concentration and alkalinity measured by the cooling water sampling unit and determine how much $CO_2$ should be added to the cooling water based upon the pH setpoint and the pH probe signal representing the cooling water pH. The $CO_2$ injector is adapted to receive a signal from the control system representing the determined amount of $CO_2$ to be added to the cooling water add the determined amount of $CO_2$ to the cooling water.

The other assembly may include one or more of the following aspects.

the cooling water sampling unit is further adapted to measure both a temperature and also either a total dissolved solids or a conductivity of the withdrawn sample of cooling water.

the control system is further adapted and configured to receive a signal or signals from said cooling water sampling unit representing the measured cooling water temperature and either the measured cooling water total dissolved solids or conductivity, as measured by said cooling water sampling unit.

the algorithm calculates the pH setpoint based upon:
  a desired scaling index value stored therein; and
  the measured cooling water $Ca^{2+}$ concentration, alkalinity, temperature, and either the measured cooling water total dissolved solids or conductivity.

the assembly further comprises a mineral acid injector, wherein:

the cooling water sampling unit is further adapted to measure an alkalinity of makeup water introduced into the cooling water system;

the control system is further adapted to receive a signal from the cooling water sampling unit representing the measured makeup water alkalinity;

the algorithm is further adapted to determine an amount of mineral acid to be added to the makeup water based upon the signal representing the measured makeup water alkalinity; and the mineral acid injector is adapted to receive a signal from the control system representing the determined amount of mineral acid and add the determined amount of mineral acid to the makeup water.

the assembly further comprises a mineral acid injector, wherein:

the cooling water sampling unit is further adapted to measure a $Ca^{2+}$ concentration, alkalinity, and pH of makeup water introduced into the cooling water system;

the control system is further adapted to receive a signal or signals from the cooling water sampling unit representing the measured makeup water $Ca^{2+}$ concentration, pH and alkalinity;

the algorithm is further adapted to calculate a second pH setpoint based upon both a desired makeup water scaling index value stored therein and the measured makeup water $Ca^{2+}$ concentration and alkalinity;

the algorithm is further adapted to determine an amount of mineral acid to be added to the makeup water based upon the second pH setpoint and the measured makeup pH; and said mineral acid injector is adapted to receive a signal from the control system representing the determined amount of mineral acid and add the determined amount of mineral acid to the makeup water.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 3:
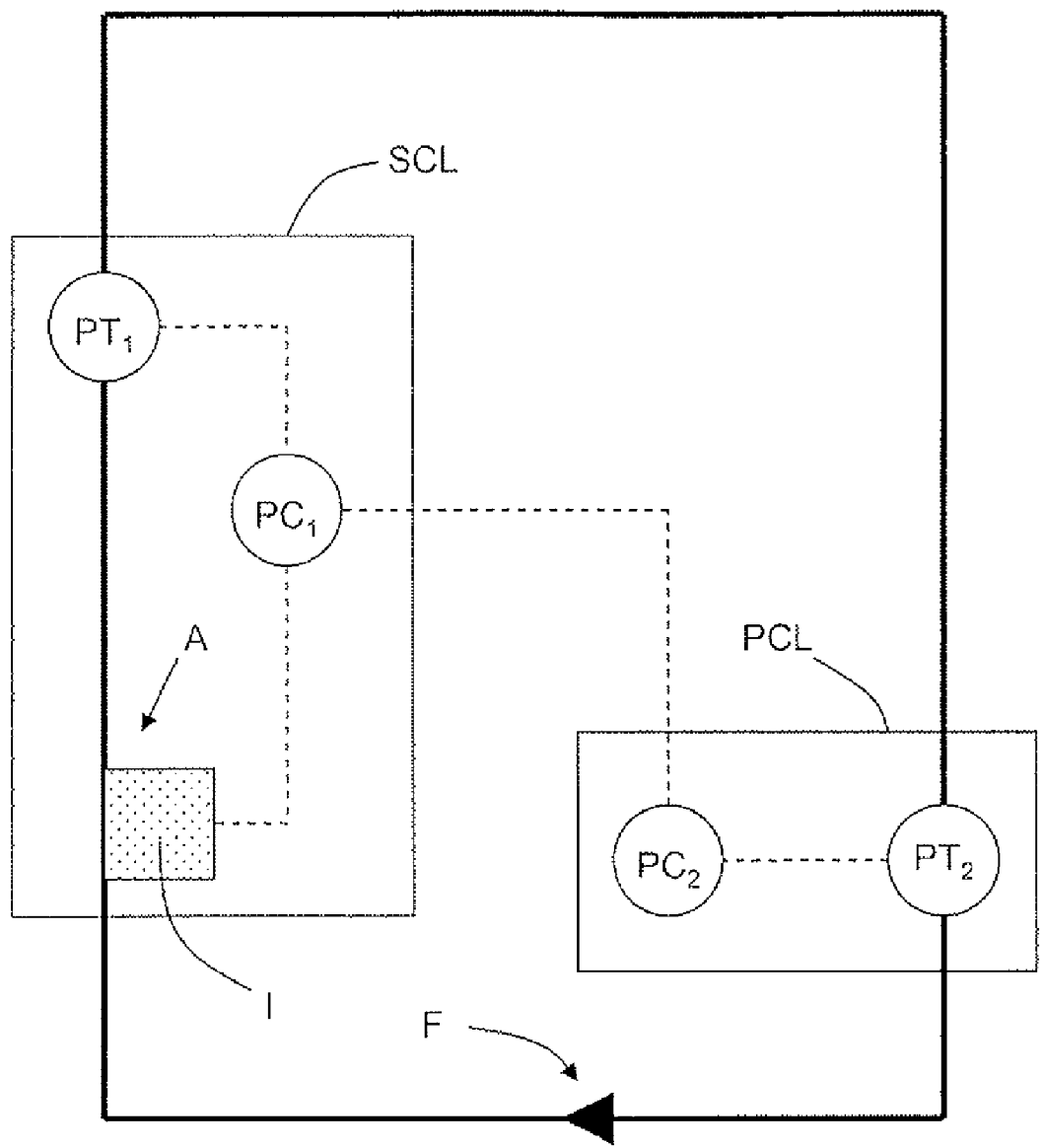
FIG. 3 is a schematic of an embodiment of the control scheme of the invention.

As best shown in FIG. 3, the tendency of the cooling water to form scale is controlled with a primary control loop PCL and a secondary control loop SCL. The secondary control loop SCL involves measurement of the cooling water pH by pH measurement device $PT_1$ and controlled addition of $CO_2$ to the cooling water by slave controller $PC_1$. A setpoint pH utilized by the secondary control loop SCL is determined by the primary control loop PCL. In the PCL, certain chemical or physical properties of the cooling water are measured by scaling measurement device $PT_2$ and transmitted to a master controller $PC_2$ which calculates the setpoint pH based upon a predetermined scaling index value and the values of the measured properties.

Examples of scaling indices from which predetermined values are selected include the Langelier Saturation Index (LSI) and the Ryznar Stability Index (RSI). Calculation of the setpoint pH is discussed in detail later. For purposes of describing and depicting a control scheme, the descriptor "scaling measurement device" and the label "$PT_2$" were used. However, it should be noted that the scaling measurement device $PT_2$ is not necessarily a device per se. Rather, it is within the scope of the invention to manually measure one or more or even all of the cooling water properties of interest.

Figure 1:
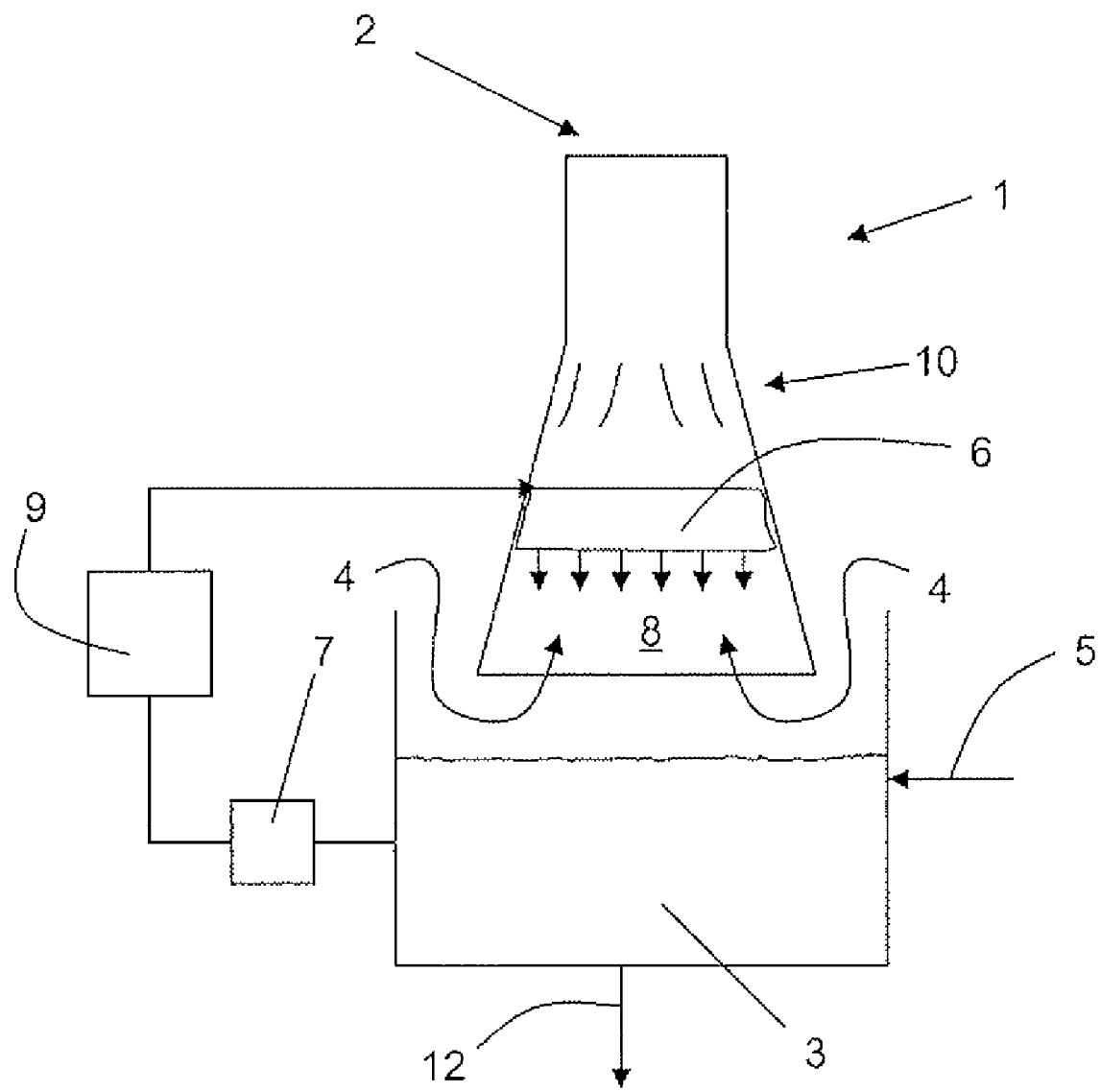
FIG. 1 is a schematic of a typical cooling circuit including a cooling tower having a fill media.
Figure 2:
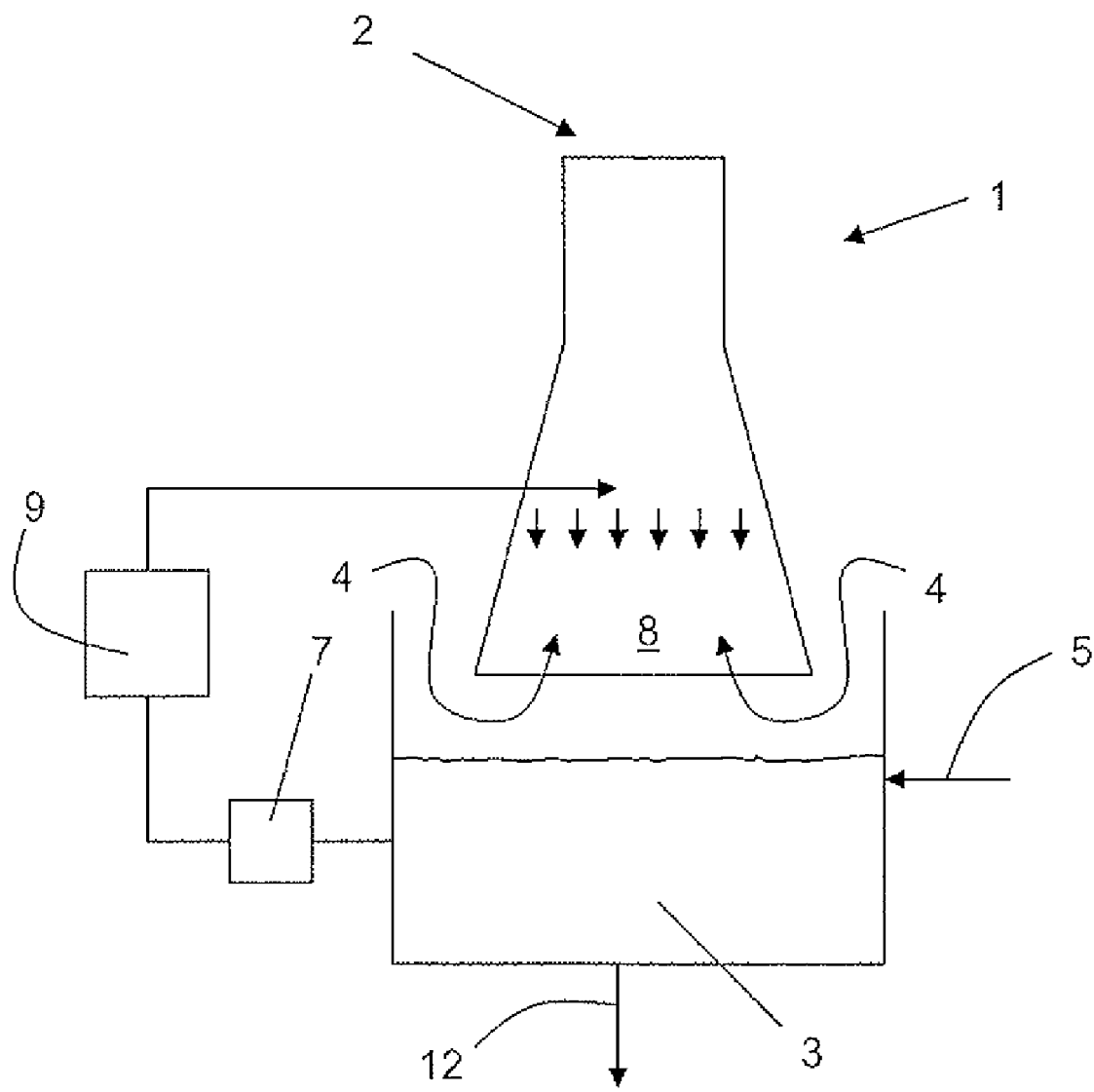
FIG. 2 is a schematic of a typical cooling circuit including a cooling tower without a fill media.

The slave controller $PC_1$ sends a signal to a control valve associated with injector I indicating how much, if any, $CO_2$ to add to the cooling water at addition point A. The $CO_2$ may be either gaseous or liquid in form. In the case of gaseous $CO_2$, the injector I may be any gas/liquid transfer device adapted to add $CO_2$ to an aqueous stream. For example, the injector I may be a simple diffuser, a nozzle, or an open tube. In the case of liquid $CO_2$, the injector I simply has a closeable end for discharging the liquid $CO_2$ into the cooling water. For simplicity's sake, FIG. 2 depicts the scaling measurement device $PT_2$, CO2 addition point A, and pH measurement device $PT_1$ in that order along the flow F of the cooling water. However, many permutations of their order with respect to the flow of cooling water are within the scope of the invention and are discussed in greater detail below. The most desirable order is first A, then $PT_1$, and then $PT_2$.

With continuing reference to FIG. 3, the master and slave controllers $PC_2$, $PC_1$ are typically programmable logic controllers written with algorithms adapted to calculate the setpoint pH and $CO_2$ addition, respectively. While the schematic of FIG. 2 depicts the controllers $PC_2$, $PC_1$ as separate programmable logic controllers, it is within the scope of the invention to have a single controller incorporating each of the functions of the master and slave controllers $PC_2$, $PC_1$ and communicating with each of the pH measurement device $PT_1$, the scaling measurement device $PT_2$, and the injector I.

The algorithm of the master controller $PC_2$ (or a single controller incorporating the functions of the master and slave controllers $PC_2$, $PC_1$) is adapted to calculate the pH setpoint based upon a predetermined scaling index value and the measured cooling water properties. The choice of scaling index value and the types of cooling water properties incorporated into the algorithm will depend upon which scaling index (LSI or RSI) is selected. If an LSI value is incorporated into the algorithm of the master controller $PC_2$, the cooling water properties to be measured include the $Ca^{2+}$ concentration, total alkalinity, and optionally temperature and total dissolved solids (TDS). If an RSI value is incorporated into the algorithm of the master controller $PC_2$, the cooling water properties to be measured include the $Ca^{2+}$ concentration, total alkalinity, temperature, and total dissolved solids (TDS).

One of ordinary skill in the art will recognize that TDS may only be determined by a gravimetric method, one widely accepted standard method of which is the Method 2540 C described in Standard Methods for the Examination of Water and Wastewater, $20^{th}$ Edition. However, for the sake of convenience and rapidity of measurement, the electrical conductivity of the cooing water (EC) is often used as an estimate of TDS. The EC may be used as an estimate for TDS as follows. A plot of measured TDS values vs. measured EC values is first obtained. The measured correlation between TDS and EC can then be inserted in a PLC to convert the EC measurement to a TDS value. However, care must be take to verify that the ratio between the measured EC and TDS is within the Standard-accepted range. According to the Standard Methods for the Examination of Water and Wastewater, $20^{th}$ Edition, 1030 E "Checking Correctness of Analysis", a valid range of ratios of measured TDS to EC is from 0.55:1.00 to 0.70:1.00. If the determined ratio is outside these limits, the measured TDS and/or EC is suspect. In that case, the TDS and EC must be reanalyzed and a new plot obtained. For embodiments of the invention where TDS is a component of a scaling index value, the scope of the invention includes the actual TDS as determined by the gravimetric method, an estimated TDS obtained by measuring the EC, or any other equivalent methods.

If the LSI is selected, various equations may be incorporated into the algorithm for calculating the pH setpoint. In a pH range of 7.0-10.3, one equation for calculating the pH setpoint ($pH_{SP}$) is as follows:

$$pH_{SP} = LSI + (pK_2 - pK_{calcium\ carbonate}) + pCa + pAlk$$
where $pK_2$=second dissociation constant for carbonic acid ($HCO_3^{-1}$ to $CO_3^{-2}$)
$pK_{calcium\ carbonate}$=solubility constant for $CaCO_3$
pCa=negative logarithm of the molal (mol/kg) concentration of $Ca^{2+}$
pAlk=negative logarithm of the molal (mol/kg) concentration of alkalinity The above equation may be corrected for temperature and total dissolved solids (TDS) as follows:

$$pH_{SP} = LSI + 9.3 + A + B - C - D \text{ where}$$

A=0.1 (log(TDS expressed as mg/L)−1)
B=−13.12 log(° C.+273.15)+34.55
C=log($Ca^{2+}$ expressed as mg/L $CaCO_3$)−0.4
D=log(M Alkalinity expressed as mg/L $CaCO_3$)

It is well known in the art that LSI values greater than 0 typically indicate that the cooling water is super saturated and will tend to precipitate a scale layer of $CaCO_3$ while LSI values less than 0 typically indicate that the cooling water is under saturated and tends to dissolve solid $CaCO_3$. Equally known is that an LSI value of 0 typically indicates that the cooling water is saturated (in equilibrium) with $CaCO_3$ so that a scale layer of $CaCO_3$ is neither precipitated nor dissolved. While these are typical indicators of scaling or non-scaling, is also known that the borderline between scaling and dissolution of CaCO3 may shift up or down from 0 due to the impact of several factors. For example, the pH at the surface of wetted metal surfaces can be higher than the bulk water pH so measurement of hardness, alkalinity, TDS, and temperature in the bulk water may not exactly correlate with conditions at the wetted metal surface. Also, scale inhibitors can significantly increase the degree of calcium carbonate saturation by several orders of magnitude (corresponding to a change in the LSI value of about 2 units). Furthermore, areas experiencing relative high degrees of turbulence are accepting of slightly higher LSI values because scaling that would ordinarily occur tends to be mechanically removed from the metal surface by the turbulent flow.

Because an LSI value of 0 is not always completely predictive of scaling or non-scaling, the LSI value selected for the equation used to calculate the pH setpoint may be obtained through collection of empirical data from the cooling circuit whose scaling is attempted to be controlled. If the initial selected LSI value results in too high a degree of scaling or dissolution of scale (in other words $CO_2$ is wasted), the selected LSI value may be adjusted based upon that empirical data or the experience of the operator associated with the cooling circuit. Typically though, the selected LSI value is desirably within the range of from about 0 to about +1.

If the RSI is selected, various equations may be incorporated into the algorithm for calculating the pH setpoint. One equation is as follows:

$$pH_{SP}=2(9.3+A+B-C-D)-RSI \text{ where}$$

A=0.1 (log(TDS, mg/L)−1)
B=−13.12 log(° C.+273.15)+34.55
C=log($Ca^{2+}$, mg/L $CaCO_3$)−0.4
D=log(M Alkalinity, mg/L $CaCO_3$)

It is well known in the art that RSI values less than 6 typically indicate that the cooling water is super saturated and will tend to precipitate a scale layer of $CaCO_3$ while RSI values greater than 6 typically indicate that the cooling water is under saturated and tends to dissolve solid $CaCO_3$. Equally known is that an RSI value of 6 typically indicates that the cooling water is saturated (in equilibrium) with $CaCO_3$ so that a scale layer of $CaCO_3$ is neither precipitated nor dissolved. While these are typical indicators of scaling or non-scaling, is also known that the borderline between scaling and dissolution of $CaCO_3$ may shift up or down from 6 due to the impact of the factors described above with respect to the LSI. Similar to the LSI, because an RSI value of 6 is not always completely predictive of scaling or non-scaling, the RSI value selected for the equation used to calculate the pH setpoint may be obtained through collection of empirical data from the cooling circuit whose scaling is attempted to be controlled. If the initial selected RSI value results in too high a degree of scaling or dissolution of scale (in other words $CO_2$ is wasted), the selected LSI value may be adjusted based upon that empirical data or the experience of the operator associated with the cooling circuit. Typically though, the selected RSI value is desirably within the range of from about 5.5 to about 6.5.

One of ordinary skill in the art will recognize that other formulations of the Langelier Saturation Index and the Ryznar Stability Index are known in the art and that different derivations of the above equations utilizing different units of measurement may be performed. One of ordinary skill in the art will further recognize that new scaling indices incorporating a pH component may be developed in the future. Thus, it is understood that the invention is not limited to the above equations but may utilize any scaling index equation known in the art (or those that are later developed) that includes a pH component where the equation is reformulated in terms of measured pH.

While measurement of the Ca2+ concentration, alkalinity and optional temperature and TDS may be performed manually with the measured values inputted into the master controller $PC_2$, preferably it is performed automatically under the control of master controller $PC_2$. Such automatic control includes commands from the master controller $PC_2$ to withdraw a sample from the flow of cooling water and direct it to the scaling measurement device $PT_2$. The $Ca^{2+}$ concentration, alkalinity, temperature and TDS may be measured as often as the scaling measurement device $PT_2$ allows or as seldom as the operator cares to calculate a new setpoint pH (or confirm that the pH setpoint should not be changed).

The maximum frequency with which the $Ca^{2+}$, alkalinity, and optionally temperature and TDS can be measured is a factor of the cycle times of the analytical instruments for measuring the analytes of interest and how many analytical instruments are utilized. In other words, when an instrument has a relatively long cycle time (such as 40 minutes) for measuring one of the analytes of interest, multiple of such instruments may measure the analyte of interest in a staggered fashion thereby allowing measurement of the $Ca^{2+}$ concentration, alkalinity, temperature and TDS in a fraction of the time that is otherwise required. Preferably, the $Ca^{2+}$ alkalinity, and optionally temperature and TDS should be measured at least twice daily.

Preferably the scaling measurement device $PT_2$ is a cabinet containing a collection of analytical instruments adapted to measure the $Ca^{2+}$ concentration, pH, alkalinity and optional temperature and TDS. The cabinet includes a single sampling line that communicates with a manifold for directing portions of the withdrawn cooling water sample to various analytical instruments that individually measure the $Ca^{2+}$ concentration, pH, alkalinity and optional temperature and TDS. The cabinet further includes a waste line for discharging the sample.

One suitable commercially available instrument for measuring pH, temperature and TDS is the Chemtrol CT3000 device available from Chemtrol of Santa Barbara, Calif. One suitable commercially available instrument for measuring $Ca^{2+}$ concentration and alkalinity is the ADI 2040 Process Analyzer available from Applikon Analytical located in the Netherlands. Many other commercially available instruments exist for measuring the $Ca^{2+}$, alkalinity, pH, temperature and TDS either singly or in combination.

Figure 4:
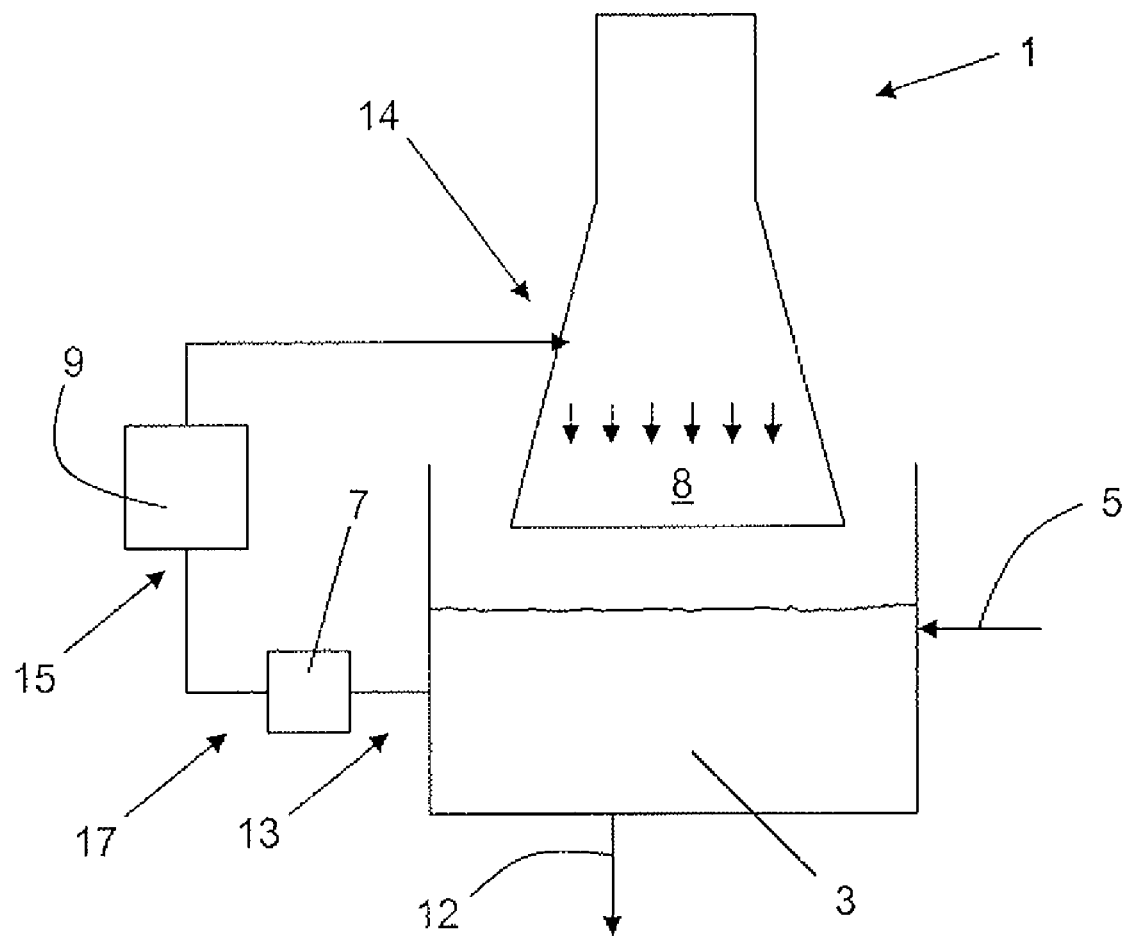
FIG. 4 is a schematic of a cooling circuit including a cooling tower indicating some particular points where $CO_2$ is added according to the invention.

With reference to FIG. 4, $CO_2$ may be added to the cooling water at any point in the cooling circuit from the basin 3 up to an inlet 14 of the cooling tower 1. Several $CO_2$ injectors are commercially available and well known, so their details need not be duplicated herein.

Also, the cooling water sample from which the pH is measured may be obtained from any point in the cooling circuit from just downstream of the $CO_2$ addition point up to inlet 14. Preferably, the pH is measured just downstream of the $CO_2$ addition point. A multitude of pH sensors are commercially available and well known in the art, so their details need not be duplicated herein.

Similarly, the cooling water sample from which the $Ca^{2+}$, alkalinity (and optionally temperature and TDS) is measured may be obtained from any point in the cooling circuit from just downstream of the $CO_2$ addition point up to inlet 14.

In an optional aspect of the invention, the $Ca^{2+}$, alkalinity (and optionally temperature and TDS) of a sample of rain 8 may also be measured in order to provide additional information with which to select a pH setpoint. If this option is selected, the pH setpoint to be utilized by slave controller $PC_1$ may simply be the average of a pH setpoint based upon the sample of rain 8 and that of a sample of cooling water obtained from a point in the cooling circuit from just downstream of the $CO_2$ addition point up to inlet 14. Instead of simplying averaging the two values, an operator may optimize selection of the pH setpoint to be utilized by slave controller $PC_1$. In this alternative, the pH setpoint to be utilized by the slave controller $PC_1$ may be a value intermediate that of a pH setpoint based upon the sample of rain 8 and that of a sample of cooling water obtained from a point in the cooling circuit from just downstream of the $CO_2$ addition point up to inlet 14. An operator may simply observe the degree of scaling in the cooling circuit and adjust the optimized pH setpoint either towards or away from the pH setpoint based upon the sample of rain 8. Regardless of the particular control scheme selected (averaging vs. optimization), one of ordinary skill in the art will recognize that samples of rain 8 may be physically difficult to retrieve from some cooling water circuits. In that case, the $Ca^{2+}$, alkalinity (and optionally temperature and TDS) of the cooling water in the basin 3 and cooling water 5 may be measured and a mass balance of the cooling water circuit performed in order to back-calculate the $Ca^{2+}$, alkalinity (and optionally temperature and TDS) of the rain.

In the case of a heat exchange system 9 having a single heat exchanger or multiple heat exchangers in parallel, the $CO_2$ is preferably added at any point from an outlet 13 of the basin 3 up to an inlet 15 of the heat exchange system 9. Accordingly, the pH would be measured at any point just downstream of the $CO_2$ addition point up to a cooling water inlet 14 of the cooling tower 1. Most preferably in this case, the CO2 is added to the cooling water at any point from an outlet of the pump 17 to downstream of the heat exchange system 9 with the pH being measured downstream of the $CO_2$ addition point and just upstream of the heat exchange system 9.

In the case of a heat exchange system 9 having two or more heat exchangers in series, the $CO_2$ is preferably added at any point from an outlet 13 of the basin 3 to just upstream of the furthest downstream heat exchange in the heat exchange system 9. Accordingly, the pH would be measured at any point just downstream of the $CO_2$ addition point up to inlet 14. Most preferably in this case, the $CO_2$ is added to the cooling water at any point from an outlet of the pump 17 to just upstream of the furthest downstream heat exchange in the heat exchange system 9 with the pH being measured at any point downstream of the $CO_2$ addition point and just upstream of the furthest downstream heat exchange in the heat exchange system 9.

A further optional aspect of the invention includes removal of a portion of the $CO_2$ in the cooling water downstream of heat exchange system 9 and upstream of inlet 14 by using a decarbonating system such as that described by U.S. Pat. No. 5,611,933. The removed $CO_2$ can then be diverted via a gas conduit and pump to the cooling water contained in the basin 3. Of course, the decarbonation does not necessarily need to be performed in a slip stream. This optional aspect is advantageous in two situations: in cooling circuits not including fill media, and also in cooling circuits to which excessive amounts of $CO_2$ are added. In the first situation, because there is no fill, there is no need to prevent scale formation upon the fill, and the $CO_2$ that would otherwise be stripped from the cooling water at tower 1 can instead be reused elsewhere in the cooling circuit (such as in the basin 3). In the second situation, it is advantageous to remove at least a portion of the $CO_2$ in the cooling water at inlet 14 when excessive amounts of CO2 are ordinarily added to the cooling circuits. For example, when a RSI having a value well above 6 (such as an RSI of >7, >7.5, or even as high as 8 or greater) or a LSI having a value well below 0 (such as an LSI of no more than −1, no more than −1.5, or even as low as no more than −2) is desired for the cooling circuit, the amount of $CO_2$ added exceeds the amount ordinarily expected to achieve an equilibrium with respect to scaling. This may be desirable when the heat exchange system 9 is highly susceptible to degradation from scaling. The removed portion of $CO_2$ may be reused elsewhere in the cooling circuit (such as in the basin 3).

A further optional aspect of the invention is the controlled addition of a mineral acid such as HCl or $H_2SO_4$. In this manner, the mineral acid and CO2 together operate to adjust the pH of the cooling water. The controlled addition may be performed in any of five ways.

First, the mineral acid may be added to the makeup water 5 in order to achieve a relatively constant alkalinity of the makeup water 5. This first alternative may be accomplished with a feedback control sub-system which measures the alkalinity of the makeup water 5 and adds a controlled amount of mineral acid in order to maintain a setpoint alkalinity in the makeup water 5. The setpoint alkalinity is determined by the operator. Preferably, the controller receives a signal representing the measured alkalinity of the makeup water 5 from the scaling measurement device $PT_2$. An algorithm written to a programmable logic controller then determines how much mineral acid should be added to the makeup water 5 based upon the signal from the scaling measurement device $PT_2$. A mineral acid injector then receives a signal from the programmable logic controller representing the amount of mineral acid to be added. Finally, the mineral acid injector adds the determined amount of mineral acid to the makeup water 5.

Second, the mineral acid may be added to the makeup water 5 or basin 3 in order to control the alkalinity of the makeup water 5 or basin 3 such that it is a predetermined fraction of the alkalinity of the cooling water as measured by $PT_2$ (or by an operator) in practice of the invention. In other words, each time scaling index measurement device $PT_2$ (or an operator) measures the alkalinity of the cooling water for the master controller $PC_2$, the alkalinity setpoint for the makeup water 5 or basin 3 is calculated by an algorithm written to a programmable logic controller that multiplies the cooling water alkalinity by a predetermined fraction. For example, an operator may desire to maintain the alkalinity of the makeup water 5 at a tenth of the alkalinity of the cooling water in the remainder of the cooling circuit. A mineral acid injector receives a signal from the programmable logic controller representing the amount of mineral acid to be added. The mineral acid injector adds the determined amount of mineral acid to the makeup water 5 or basin 3.

Third, a constant amount of $H_2SO_4$ may be added to the cooling circuit that is designed to avoid reaching levels of sulfates ($SO_4^{2-}$) in the blowdown 12 subject to environmental regulation. Preferably, it is added in the makeup water 5 or basin 3. This may be accomplished by performing a mass balance of sulfates on the cooling water system based upon historic levels of sulfates in the blowdown. Using this mass balance, it is possible to calculate a maximum amount of $H_2SO_4$ that may be added to the cooling water that will avoid those regulated sulfate levels. Any pH adjustment that is not achievable by addition of the $H_2SO_4$ due to this maximum limit can be realized through addition of $CO_2$ according to the invention, which of course does not increase the concentration of sulfates in the cooling water. Preferably, the amount/rate of mineral acid addition is controlled by a programmable logic controller written with an algorithm. A mineral acid injector receives a signal from the programmable logic controller representing the amount of mineral acid to be added. Finally, the mineral acid injector adds the determined amount of mineral acid to the makeup water 5.

Fourth, the mineral acid may be added to the makeup water 5 or the basin 3 in order to control the scaling index value (RSI or LSI) of the makeup water 5 or the basin 3. This may be performed in the same way that the scaling index value of the cooling circuit is controlled by the invention with $CO_2$, but in this case, the RSI or LSI of the makeup water 5 or the basin 3 is controlled with mineral acid.

Fifth, the mineral acid may be added to the makeup water 5 based upon the alkalinity of the cooling water as measured by $PT_2$ (or by an operator) in practice of the invention. Using his or her experience, an operator may select a desired alkalinity setpoint sought to be achieved in the cooling water and inputs it to a programmable logic controller associated with the mineral acid injector. Based upon the alkalinity measured in the cooling water and the selected cooling water alkalinity setpoint, a mineral acid injector receives a signal from the programmable logic controller representing the amount of mineral acid to be added. The mineral acid injector adds the determined amount of mineral acid to the makeup water 5. The programmable logic controller may be tuned in a known manner.

Sixth, the mineral acid may be added to the makeup water 5 in order to achieve a relatively constant alkalinity of the makeup water 5, the precise value of which is based upon the alkalinity of the cooling water. This sixth alternative may be accomplished with a feedback control sub-system which measures the alkalinity of the makeup water 5 and adds a controlled amount of mineral acid in order to maintain a setpoint alkalinity in the makeup water 5. In contrast to the first alternative, the setpoint alkalinity in this case is not determined by an operator. Rather, the setpoint alkalinity is determined by a programmable logic controller which compares the alkalinity measured in the cooling water by scaling measurement device $PT_2$ (or by an operator) with a desired alkalinity to be maintained in the cooling water. Based upon how closely the alkalinity of the cooling water is maintained near the desired alkalinity, the programmable logic controller determines the setpoint for the feedback control sub-system associated with the makeup water. Preferably, the programmable logic controller receives a signal representing the measured alkalinity of the makeup water 5 from the scaling measurement device $PT_2$. An algorithm written to the programmable logic controller then determines the setpoint that should be communicated to the feedback control sub-system associated with the makeup water. The feedback control sub-system receives a signal representing the measured alkalinity of the makeup water 5 from the scaling measurement device $PT_2$ and determines how much mineral acid should be injected into the makeup water 5 based upon the setpoint received from the programmable logic controller and the measured alkalinity of the makeup water 5. A mineral acid injector then receives a signal from the feedback control sub-system representing the amount of mineral acid to be added. Finally, the mineral acid injector adds the determined amount of mineral acid to the makeup water 5.

Regardless of which of the four options is selected, it is most preferable to:

1) add carbon dioxide to the cooling water at a point within the recycle loop (from the basin 3 to upstream of the inlet 14) to control the scaling index value (LSI or RSI) of the cooling water within the recycle loop, and
2) add mineral acid to the makeup water 5 to control the alkalinity or scaling index value (LSI or RSI).

From a control perspective, this is important for a variety of reasons. First, the makeup water 5 is a disturbance to the recycle loop and controlling the properties of the makeup water 5 using mineral acid helps mitigate this disturbance before it enters the recycle loop. Second, the proposed scheme minimizes the potential for harmful interaction between the $CO_2$ and mineral acid controllers.

With reference to FIGS. 3-4, a preferred embodiment of the invention may be practiced as follows. The $Ca^{2+}$ concentration, alkalinity, temperature, and TDS of the cooling water are periodically measured with scaling measurement device $PT_2$. Each time the master controller $PC_2$ receives a new set of measured values from the scaling measurement device $PT_2$, the algorithm written to master controller $PC_2$ calculates a pH setpoint ($pH_{SP}$) according to the following equation:

$$pH_{SP} = LSI + 9.3 + A + B - C - D \text{ where}$$

$A = 0.1 (\log(TDS, mg/L) - 1)$
$B = -13.12 \log(° C. + 273.15) + 34.55$
$C = \log(Ca^{2+}, mg/L\ CaCO_3) - 0.4$
$D = \log(M\ Alkalinity, mg/L\ CaCO_3)$ The pH setpoint ($pH_{SP}$) is then communicated by the master controller $PC_2$ to the slave controller $PC_1$. At frequencies greater than measurement of the values used to calculate the pH setpoint, the pH of the cooling water is measured by pH measurement device $PT_1$. Using the measured pH communicated by $PT_1$, the slave controller $PC_1$ then determines how much, if any, $CO_2$ should be added to the cooling water with reference to the pH setpoint.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A method for controlling scale formation in a cooling water system, said method comprising the steps of:
   selecting a desired scaling index value indicating a desired degree of scaling or absence of scaling in the cooling water system;
   obtaining a sample of cooling water from the cooling water system;
   measuring a $Ca^{2+}$ concentration and alkalinity of the sample;
   calculating a setpoint pH based upon the selected scale index value and the measured $Ca^{2+}$ concentration and alkalinity;
   measuring a pH of the cooling water; and
   adding an amount of $CO_2$ to the cooling water based upon the setpoint pH and measured pH; the method further comprising the steps of:
   a) providing a cabinet enclosing:
      1) first and second programmable logic controllers, the second programmable logic controller being written with an algorithm adapted to perform said step of calculating a setpoint pH,
      2) a $Ca^{2+}$ concentration and alkalinity measurement device adapted and configured to perform said step of measuring the $Ca^{2+}$ concentration and alkalinity of the sample,
      3) a pH probe adapted and configured to perform said step of measuring the pH of the sample;

b) sending a signal corresponding to the measured $Ca^{2+}$ concentration and alkalinity from the $Ca^{2+}$ concentration and alkalinity measurement device to the second programmable logic controller;
c) sending a signal corresponding to the setpoint pH from the second controller to the first programmable logic controller;
d) sending a signal corresponding to the measured pH from the pH probe to the first programmable logic controller, wherein said step of adding comprises:
 1) determining with the first programmable logic controller whether or not $CO_2$ should be added to the cooling water system based upon whether the measured pH is higher than the setpoint pH, and
 2) adding the amount of $CO_2$ based upon said step of determining.

2. A method for controlling scale formation in a cooling water system, wherein the cooling water system includes a cooling tower, a basin adapted to receive cooling water from the cooling tower, and a heat exchange system adapted and configured to exchange heat between a hot fluid from a process and the cooling water and discharge the cooling water toward a cooling water inlet formed in the cooling tower, said method comprising the steps of:
 selecting a desired scaling index value indicating a desired degree of scaling or absence of scaling in the cooling water system;
 obtaining a first sample of cooling water from the cooling water system, the first sample not being obtained from the cooling water received by the basin from the cooling tower;
 measuring a $Ca^{2+}$ concentration and alkalinity of the first sample;
 calculating a first setpoint pH based upon the selected scale index value and the $Ca^{2+}$ concentration and alkalinity measured in the first sample;
 obtaining a second sample of cooling water, the second sample being obtained from the cooling water received by the basin from the cooling tower;
 measuring a $Ca^{2+}$ concentration and alkalinity of the second sample;
 calculating a second setpoint pH based upon the selected scale index value and the $Ca^{2+}$ concentration and alkalinity measured in the second sample;
 selecting a third pH setpoint intermediate that of the first and second pH setpoints;
 measuring a pH of the cooling water; and
 adding an amount of $CO_2$ to the cooling water based upon the third setpoint pH and measured pH.

* * * * *